(12) United States Patent
Nakai et al.

(10) Patent No.: US 10,458,547 B2
(45) Date of Patent: Oct. 29, 2019

(54) PARKING DEVICE AND METHOD OF ASSEMBLING THE SAME

(71) Applicant: AISIN AW CO., LTD., Anjo-shi, Aichi-ken (JP)

(72) Inventors: Masaya Nakai, Tokoname (JP); Takahiro Kokubu, Nishio (JP); Tomonari Okamoto, Anjo (JP); Kazunori Ishikawa, Toyota (JP); Susumu Kato, Anjo (JP); Kenichi Naka, Anjo (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 0 days.

(21) Appl. No.: 15/574,200

(22) PCT Filed: Jun. 17, 2016

(86) PCT No.: PCT/JP2016/068118
§ 371 (c)(1),
(2) Date: Nov. 15, 2017

(87) PCT Pub. No.: WO2017/038208
PCT Pub. Date: Mar. 9, 2017

(65) Prior Publication Data
US 2018/0172154 A1   Jun. 21, 2018

(30) Foreign Application Priority Data

Aug. 28, 2015 (JP) .................................. 2015-169540

(51) Int. Cl.
| | |
|---|---|
| *F16H 63/34* | (2006.01) |
| *B60T 1/06* | (2006.01) |
| *F16H 63/38* | (2006.01) |
| *B60T 1/00* | (2006.01) |
| *F16D 63/00* | (2006.01) |

(52) U.S. Cl.
CPC .......... *F16H 63/3425* (2013.01); *B60T 1/005* (2013.01); *B60T 1/06* (2013.01);
(Continued)

(58) Field of Classification Search
CPC ............. F16H 63/3425; F16H 63/3483; F16H 63/3458; F16H 63/38; F16H 63/34;
(Continued)

(56) References Cited

U.S. PATENT DOCUMENTS

| | | | |
|---|---|---|---|
| 7,490,528 B2 * | 2/2009 | Koski ..................... | F16H 59/08 192/219.5 |
| 7,861,839 B2 * | 1/2011 | Schweiher .......... | F16H 63/3433 192/220.2 |

(Continued)

FOREIGN PATENT DOCUMENTS

| | | |
|---|---|---|
| CN | 103791082 A | 5/2014 |
| JP | 49-133107 U | 11/1974 |

(Continued)

OTHER PUBLICATIONS

International Search Report of PCT/JP2016/068118 dated Sep. 20, 2016 [PCT/ISA/210].

*Primary Examiner* — Jacob S. Scott
*Assistant Examiner* — James J Taylor, II
(74) *Attorney, Agent, or Firm* — Sughrue Mion, PLLC

(57) ABSTRACT

A detent lever 20 and a piston rod 42 are engaged with each other through engagement between a recessed portion 26 of the detent lever 20 and a pin portion 52 of a retainer member 50 attached to the piston rod 42. With this configuration, the detent lever 20 and the piston rod 42 can be engaged with each other easily and in a short time when assembling a parking device 10. As a result, the time required for the work of assembling the parking device 10 can be shortened.

16 Claims, 9 Drawing Sheets

(52) U.S. Cl.
CPC ............ *B60T 1/062* (2013.01); *F16D 63/006* (2013.01); *F16H 63/34* (2013.01); *F16H 63/3458* (2013.01); *F16H 63/3483* (2013.01); *F16H 63/38* (2013.01); *F16H 63/3475* (2013.01)

(58) Field of Classification Search
CPC ........ F16D 63/006; B60T 1/062; B60T 1/005; B60T 1/06
See application file for complete search history.

(56) References Cited

U.S. PATENT DOCUMENTS

| | | | |
|---|---|---|---|
| 9,267,599 B2* | 2/2016 | Pollack | F16H 63/3433 |
| 9,321,435 B2* | 4/2016 | Landino | B60T 1/062 |
| 2011/0198190 A1* | 8/2011 | Steinhauser | F16H 63/3491 |
| | | | 192/219.5 |
| 2014/0116835 A1 | 5/2014 | Heuver | |
| 2016/0082933 A1 | 3/2016 | Iwata et al. | |
| 2016/0091037 A1 | 3/2016 | Iwata et al. | |
| 2016/0123412 A1 | 5/2016 | Iwata et al. | |
| 2016/0208916 A1 | 7/2016 | Kokubu et al. | |

FOREIGN PATENT DOCUMENTS

| | | |
|---|---|---|
| JP | S49-133107 U | 11/1974 |
| JP | 62-248872 A | 10/1987 |
| JP | 2003-293920 A | 10/2003 |
| JP | 2014-080110 A | 5/2014 |
| WO | 2014/203898 A1 | 12/2014 |
| WO | 2014/203899 A1 | 12/2014 |

\* cited by examiner

US 10,458,547 B2

PARKING DEVICE AND METHOD OF ASSEMBLING THE SAME

CROSS REFERENCE TO RELATED APPLICATIONS

This application is a National Stage of International Application No. PCT/JP2016/068118, filed Jun. 17, 2016, claiming priority based on Japanese Patent Application No. 2015-169540, filed Aug. 28, 2015, the contents of all of which are incorporated herein by reference in their entirety.

TECHNICAL FIELD

The present disclosure relates to a parking device and a method of assembling the parking device.

BACKGROUND ART

There has hitherto been proposed a parking device that includes a parking gear, a detent lever, a parking pawl, a hydraulic unit, and a magnetic unit (see Patent Document 1, for example). In the parking device, the parking gear is attached to a rotary shaft of a transmission. The detent lever is formed in an L-shape having a first free end portion and a second free end portion, and turned about a supporting shaft. The parking pawl locks and unlocks the parking gear (rotary shaft of the transmission) in accordance with a turn of the detent lever. The hydraulic unit has a piston rod that moves in a first direction. The piston rod is moved toward one side in the first direction by the urging force of a spring to turn the detent lever to a first rotational position at which the rotary shaft of the transmission is locked. The piston rod is moved toward the other side in the first direction by a hydraulic pressure to turn the detent lever to a second rotational position at which the rotary shaft of the transmission is unlocked. Here, the piston rod is provided with a coupling recessed portion that extends from the distal end side to the base end side. The second free end portion of the detent lever is inserted into the coupling recessed portion. The second free end portion is provided with a long hole at a position to be in the coupling recessed portion. The piston rod and the detent lever are coupled to each other with the piston rod supporting a coupling pin inserted through the long hole of the detent lever. The magnetic unit has a lock shaft that moves in a second direction orthogonal to the first direction, and locks the lock shaft using a magnetic force to restrict movement of the piston rod when the distal end portion (abutment portion) of the lock shaft and a roller (contacted portion) supported by the piston rod abut against each other.

RELATED-ART DOCUMENTS

Patent Documents

[Patent Document 1] International Patent Application Publication No. 2014/203899

SUMMARY OF THE DISCLOSURE

In the parking device discussed above, to couple the piston rod of the hydraulic unit and the detent lever to each other, it is necessary to dispose the piston rod such that the position of attachment of the coupling pin to the piston rod matches the long hole of the detent lever, and thereafter attach the coupling pin to the piston rod while inserting the coupling pin through the long hole of the detent lever. Therefore, the workability of attaching the coupling pin to the piston rod is not very good because the work space around the long hole of the detent lever is small, for example, and the work takes a long time. As a result, the work of assembling the parking device takes a long time.

It is an aspect of the present disclosure to propose a configuration that makes it possible to shorten the time required for the work of assembling a parking device.

In order to achieve the foregoing aspect, the present disclosure adopts the following means.

The present disclosure provides a parking device including:

a parking gear attached to a rotary shaft of a transmission;

a detent lever that turns about a supporting shaft;

a parking pawl that is engaged with and disengaged from the parking gear in accordance with a turn of the detent lever;

a hydraulic unit that has a moving member that moves in a first direction and that locks and unlocks the rotary shaft by turning the detent lever in a first rotational direction about the supporting shaft to a first rotational position with the moving member moved to a first position in the first direction on one side in the first direction and at a zero stroke by an urging force of an urging member and turning the detent lever in a second rotational direction, which is opposite to the first rotational direction, about the supporting shaft to a second rotational position with the moving member moved to a second position in the first direction on the other side in the first direction and at a full stroke by a hydraulic pressure; and a movement restriction unit that has a movement restriction member that moves in a second direction, which is orthogonal to the first direction, and that restricts movement of the moving member when the moving member and the movement restriction member abut against each other by restricting movement of the movement restriction member, in which the detent lever is provided with a recessed portion that opens in an outer periphery of the detent lever, an engagement portion that engages with the recessed portion of the detent lever is provided at one end portion of the moving member, and when the recessed portion and the engagement portion are engaged with each other, the engagement portion turns the detent lever from the second rotational position to the first rotational position when the moving member is moved from the second position to the first position, and the engagement portion turns the detent lever from the first rotational position to the second rotational position when the moving member is moved from the first position to the second position.

In the parking device according to the present disclosure, the detent lever is provided with a recessed portion that opens in an outer periphery of the detent lever, and an engagement portion that engages with the recessed portion of the detent lever is provided at one end portion of the moving member. Further, when the recessed portion of the detent lever and the engagement portion of the moving member are engaged with each other, the engagement portion of the moving member turns the detent lever in the first rotational direction about the supporting shaft from the second rotational position (rotational position at the time when the moving member is at the second position) to the first rotational position (rotational position at the time when the moving member is at the first position) when the moving member is moved from the second position (position in the first direction at a full stroke) to the first position (position in the first direction at a zero stroke), and the engagement portion of the moving member turns the detent lever in the second rotational direction about the supporting shaft from the first rotational position to the second rotational position when the moving member is moved from the first position to the second position. With this configuration, the moving member of the hydraulic unit can be coupled to the detent lever to assemble the hydraulic unit to a case of a transmission as follows. First, the detent lever is turned in the first rotational direction about the supporting shaft toward the opposite side of the first rotational position from the second rotational position. Specifically, the detent lever is turned such that the opening of the recessed portion of the detent lever is directed generally toward one side in the first direction. Subsequently, the hydraulic unit is moved from the one side toward the other side in the first direction such that the engagement portion of the moving member enters the recessed portion of the detent lever. The hydraulic unit is further moved toward the other side in the first direction and fixed such that the detent lever is turned in the second rotational direction about the supporting shaft to the first rotational position with the recessed portion of the detent lever pushed by the engagement portion of the moving member. In this way, the moving member and the detent lever can be engaged with each other easily and in a short time. As a result, the time required for the work of assembling the parking device can be shortened.

PREFERRED EMBODIMENTS

Figure 1:
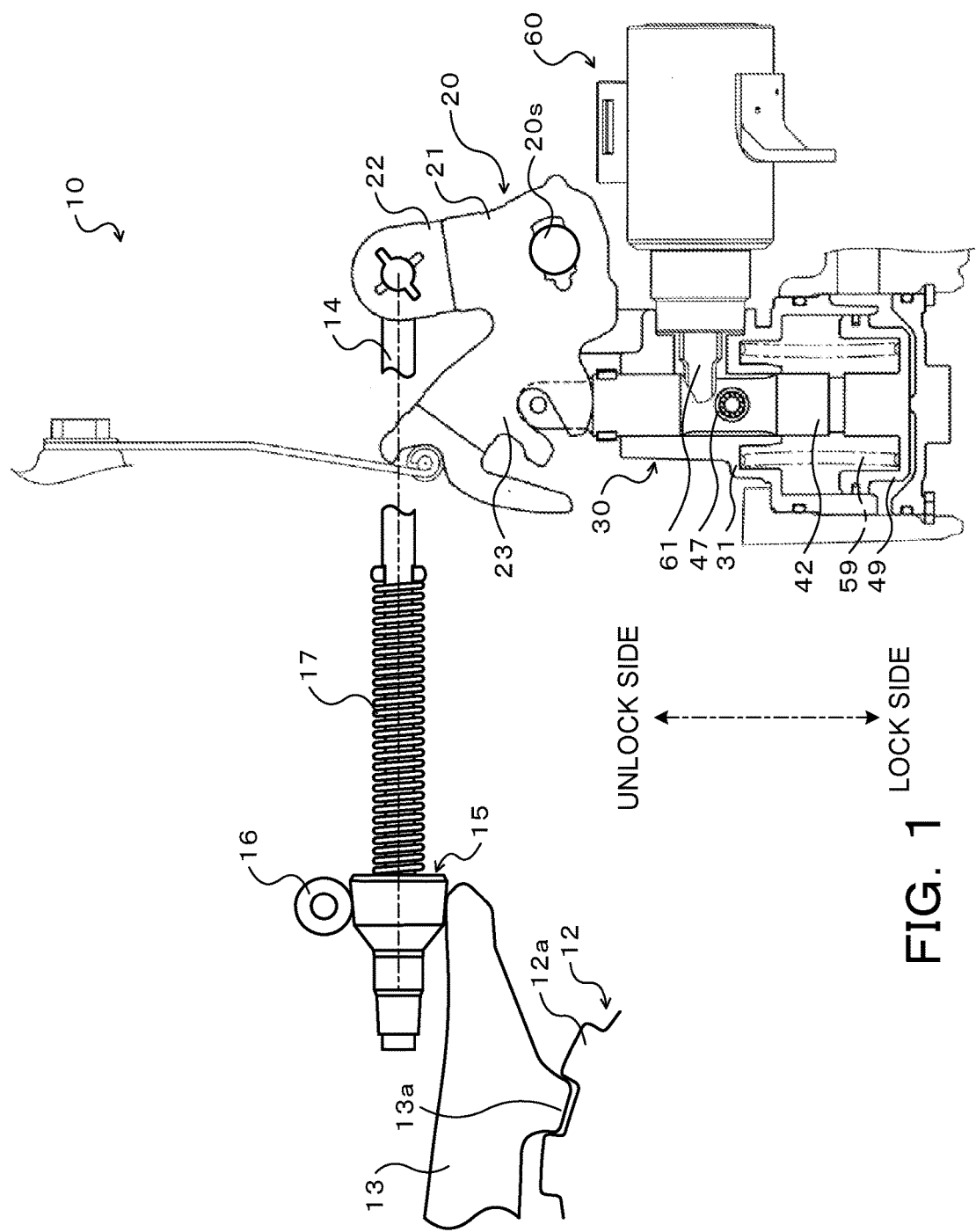
FIG. 1 is a diagram illustrating a schematic configuration of a parking device 10 according to an embodiment of the present disclosure.
Figure 2:
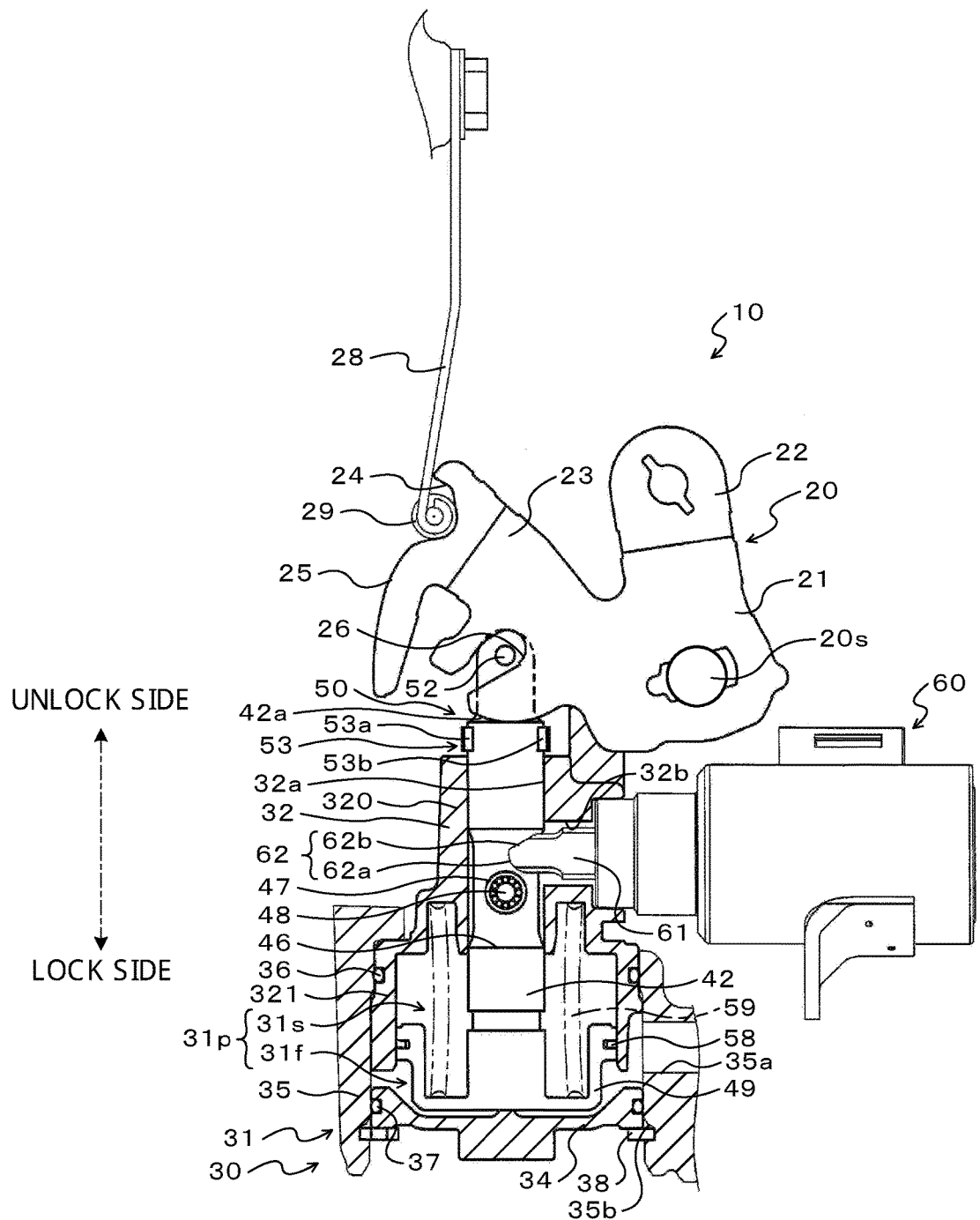
FIG. 2 is a diagram illustrating a schematic configuration of an essential portion of the parking device 10.
Figure 3:
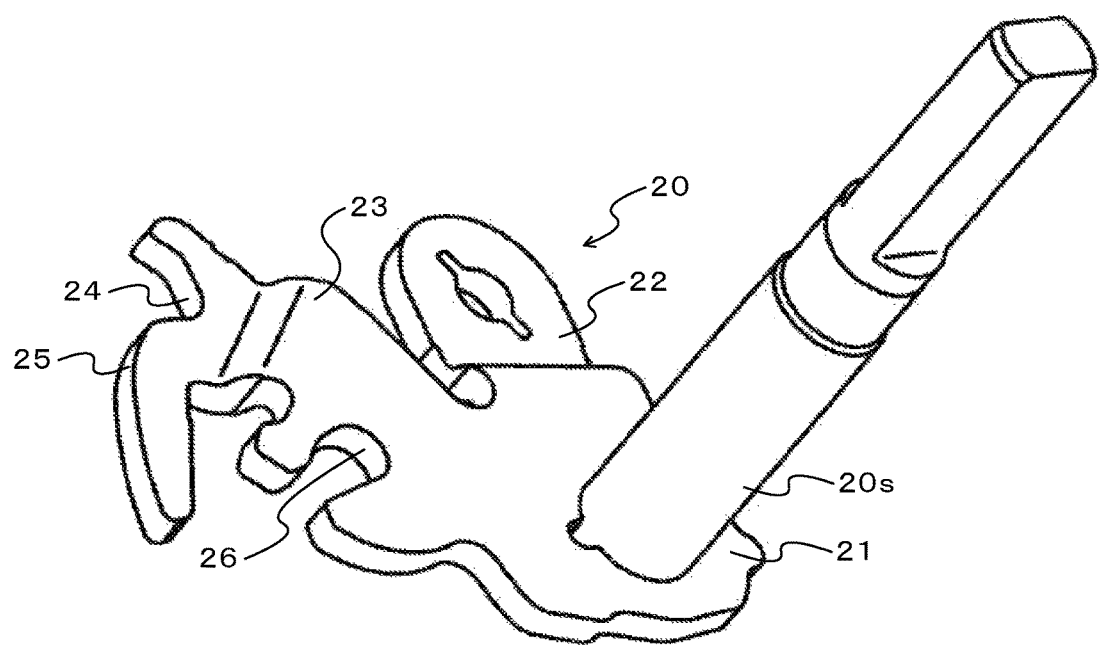
FIG. 3 is a diagram illustrating a schematic configuration of a detent lever 20.
Figure 4:
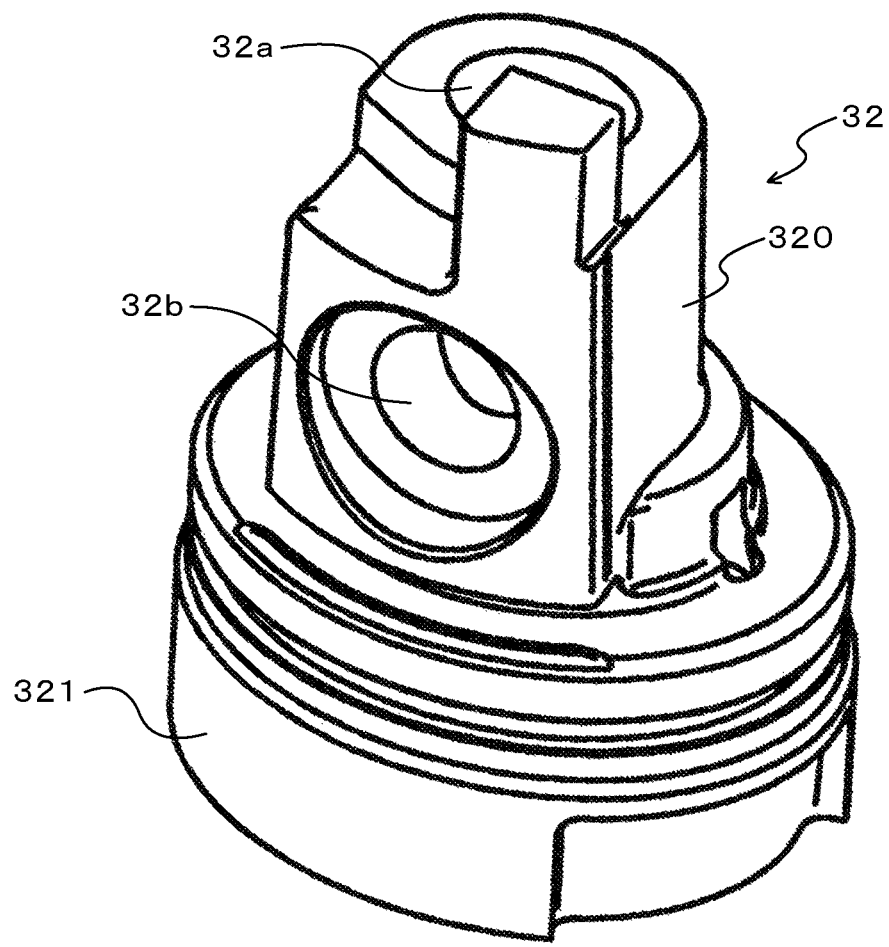
FIG. 4 is a diagram illustrating a schematic configuration of a first case member 32 of an accommodation case 31.
Figure 5:
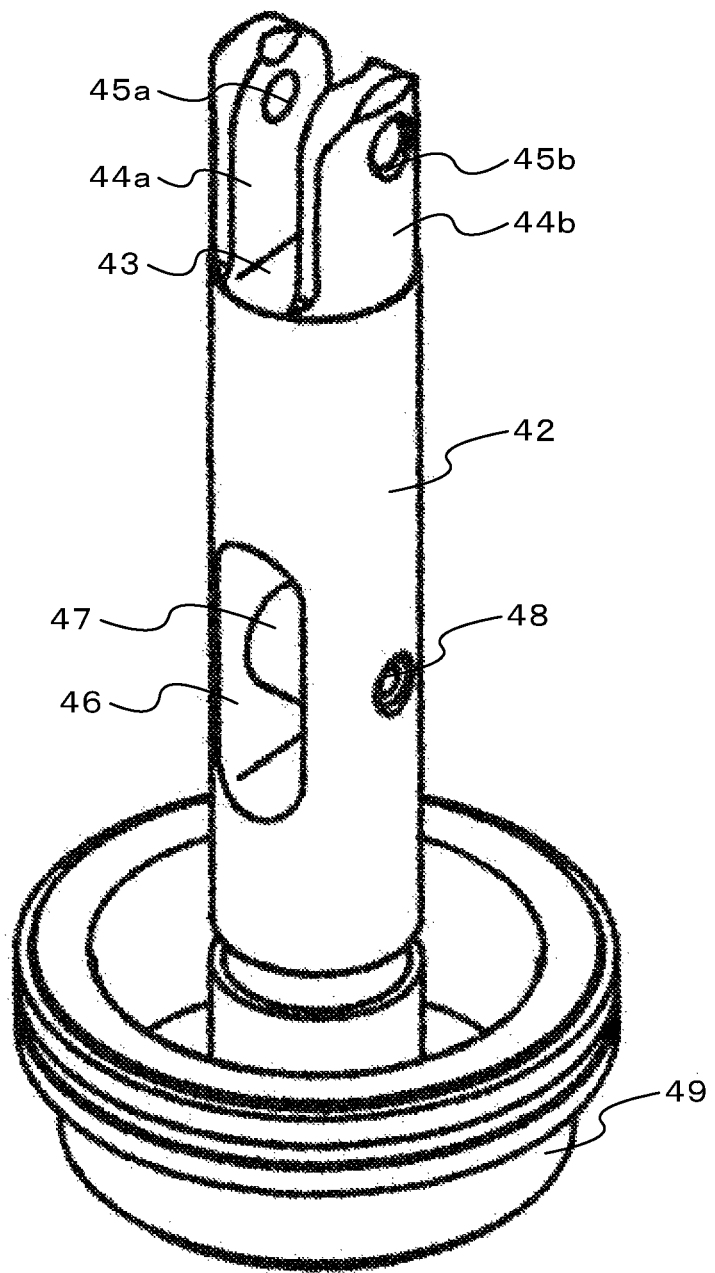
FIG. 5 is a diagram illustrating a schematic configuration of a piston rod 42 and a piston 49 of a hydraulic actuator 30.
Figure 6:
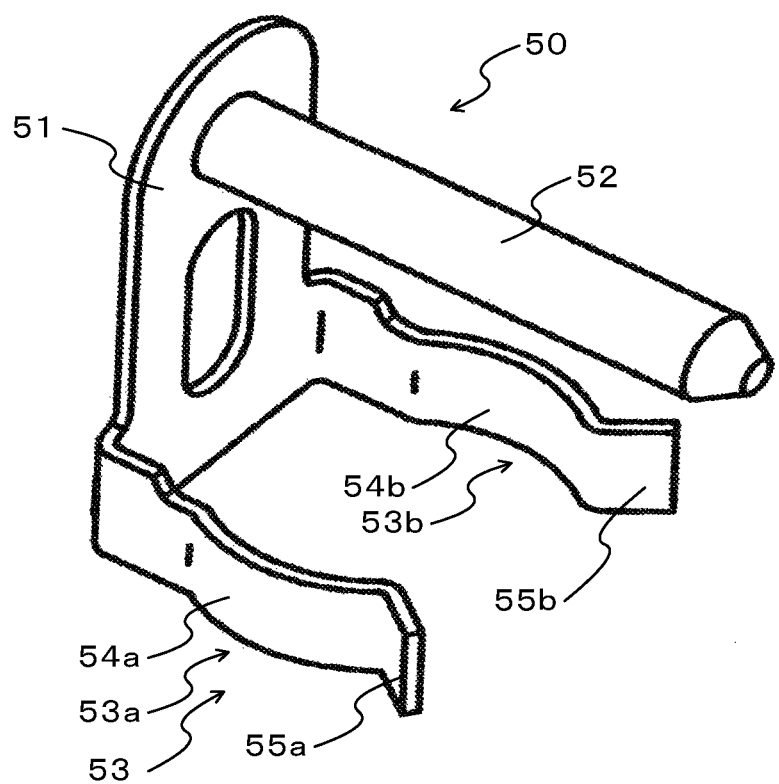
FIG. 6 is a diagram illustrating a schematic configuration of a retainer member 50.

Now, a mode for carrying out the present disclosure will be described. FIG. 1 is a diagram illustrating a schematic configuration of a parking device 10 according to an embodiment of the present disclosure. FIG. 2 is a diagram illustrating a schematic configuration of an essential portion of the parking device 10. FIG. 3 is a diagram illustrating a schematic configuration of a detent lever 20. FIG. 4 is a diagram illustrating a schematic configuration of a first case member 32 of an accommodation case 31. FIG. 5 is a diagram illustrating a schematic configuration of a piston rod 42 and a piston 49 of a hydraulic actuator 30. FIG. 6 is a diagram illustrating a schematic configuration of a retainer member 50.

The parking device 10 according to the embodiment is disposed inside or outside a transmission case of a transmission (not illustrated) mounted on a vehicle. The parking device 10 is configured as a so-called shift-by-wire parking device that locks and unlocks one of rotary shafts of the transmission on the basis of an electric signal output in accordance with the operation position (shift range) of a shift lever.

As illustrated in FIG. 1, the parking device 10 includes a parking gear 12, a parking pawl 13, a parking rod 14, a cam member 15, a support roller 16, a cam spring 17, the detent lever 20, the hydraulic actuator 30 which serves as a hydraulic unit, and a magnetic lock device 60 that serves as a movement restriction unit.

The parking gear 12 has a plurality of teeth 12a, and is attached to one of the rotary shafts of the transmission. The parking pawl 13 has a projected portion 13a that is engageable with the parking gear 12, and is urged away from the parking gear 12 by a spring (not illustrated). One end portion of the parking rod 14 is coupled to the detent lever 20. The parking rod 14 is moved in the left-right direction in FIG. 1 in accordance with a turn of the detent lever 20. The cam member 15 is formed in a tubular shape, and moved in the axial direction of the parking rod 14. The support roller 16 is supported by the transmission case, for example, and holds the cam member 15 together with the parking pawl 13. One end of the cam spring 17 is supported by the parking rod 14. The cam spring 17 urges the cam member 15 so as to push the parking pawl 13 against the parking gear 12. The parking gear 12, the parking pawl 13, the parking rod 14, the cam member 15, the support roller 16, and the cam spring 17 all have well-known configurations. When the projected portion 13a of the parking pawl 13 is engaged with a recessed portion between two adjacent teeth 12a of the parking gear 12, the rotary shaft of the transmission is locked (a parking locked state is established). When the projected portion 13a of the parking pawl 13 is moved away (disengaged) from the recessed portion of the parking gear 12, meanwhile, the rotary shaft of the transmission is unlocked (a parking unlocked state is established).

As illustrated in FIGS. 2 and 3, the detent lever 20 is generally formed in an L-shape, and has a base portion 21, a first free end portion 22, and a second free end portion 23. The base portion 21 is a base end portion of the first free end portion 22 and the second free end portion 23, and is turnably supported by a supporting shaft 20s supported by the transmission case, for example. The first free end portion 22 is turnably coupled to one end portion of the parking rod 14 discussed above. The first free end portion 21 has a bent portion between the distal end side and the base end side, and formed such that the distal end side is on the back side in FIG. 3 with respect to the base end side and extends in parallel with the base end side. A recessed portion 24 and a surface for rolling 25 are formed in a part (a portion on the left side in FIG. 3) of the outer periphery of the second free end portion 23. The recessed portion 24 is formed to be engaged with a roller 29 rotatably supported by a distal end portion of a detent spring 28 supported by the transmission case, for example, in the parking locked state. The surface for rolling 25 is formed as a smooth curved surface that extends from a position on the lower side, in FIG. 2, of the recessed portion 24, and formed such that the roller 29 is rolled thereon in accordance with a turn of the detent lever 20. A recessed portion 26 is formed in a part of the outer periphery of the second free end portion 23 at a position that is different from the recessed portion 24 and the surface for rolling 25. The second free end portion 23 has a bent portion between the distal end side and the base end side (at a position on the distal end side with respect to the recessed portion 26), and formed such that the distal end side is on the back side in FIG. 3 with respect to the base end side and extends in parallel with the base end side.

The hydraulic actuator 30 is configured as an actuator that engages and disengages the parking gear 12 and the parking pawl 13 with and from each other via the detent lever 20, the parking rod 14, and the cam 15 through movement of the piston rod 42 using the urging force (elastic force) of a return spring 59 or a hydraulic pressure. As illustrated in FIG. 2, the hydraulic actuator 30 includes the accommodation case 31, the piston rod 42, and the piston 49.

The accommodation case 31 is constituted of a plurality of members, and includes a first case member 32, a second case member 34, and a third case member 35. As illustrated in FIGS. 2 and 4, the first case member 32 includes a small diameter portion 320 in a bottomed tubular shape and a tubular large diameter portion 321 that extends downward in FIG. 4 from the small diameter portion 320 and that is larger in diameter than the small diameter portion 320. An opening portion 32a that penetrates in the axial direction is formed in the upper end portion, in FIG. 4, of the small diameter portion 320. An opening portion 32b that penetrates in the radial direction is formed in a portion of the small diameter portion 320 on the front side in FIG. 4 (right side in FIG. 2). As illustrated in FIG. 2, the second case member 34 is formed in a dish shape. The third case member 35 is attached to the transmission case. The third case member 35 is formed in such a tubular shape that the inner periphery thereof matches the outer peripheries of the large diameter portion 321 of the first case member 32 and the second case member 34. The third case member 35 is provided with an oil hole 35a that communicates between an oil chamber 31f formed by the accommodation case 31 and the piston 49 and a hydraulic control device. A seal member 36 is disposed between the outer periphery of the first case member 32 and the inner periphery of the third case member 35. A seal member 37 is disposed between the outer periphery of the second case member 34 and the inner periphery of the third case member 35. The second case member 34 is held by a snap ring 38 fitted with a recessed portion 35b of the third case member 35.

The piston rod 42 is formed to extend in the axial direction (up-down direction in FIG. 2), and moved in the axial direction to turn the detent lever 20 about the supporting shaft 20s. The piston 49 is formed integrally with the piston rod 42 on the side of the base end portion (on the side of the lower end portion in the drawing) of the piston rod 42. The piston rod 42 and the piston 49 are accommodated in the accommodation case 31 such that the distal end portion (upper end portion in FIG. 2) of the piston rod 42 projects from the opening portion 32a of the first case member 32 of the accommodation case 31.

When the piston rod 42 and the piston 49 are moved downward in FIGS. 1 and 2, the detent lever 20 is turned counterclockwise in FIGS. 1 and 2 about the supporting shaft 20s, the parking rod 14 is moved leftward in FIG. 1, and the parking pawl 13 is pressed to be engaged with the parking gear 12 by the cam member 15 which is urged by the cam spring 17, which locks the rotary shaft of the transmission to establish a parking locked state. Thus, the lower side in FIGS. 1 and 2 will hereinafter be referred to as a "lock side" as appropriate. The rotational direction of the detent lever 20 in this event (counterclockwise direction in FIGS. 1 and 2) will be referred to as a "first rotational direction" as appropriate. When the piston rod 42 and the piston 49 are moved upward in FIGS. 1 and 2, on the other hand, the detent lever 20 is turned clockwise in FIGS. 1 and 2 about the supporting shaft 20s, the parking rod 14 is moved rightward in FIG. 1, and the parking pawl 13 is not pressed by the cam member 15 any more, which releases engagement between the parking gear 12 and the parking pawl 13 (lock of the rotary shaft of the transmission) to establish a parking unlocked state. Thus, the upper side in FIGS. 1 and 2 will hereinafter be referred to as an "unlock side". The rotational direction of the detent lever 20 in this event (clockwise direction in FIGS. 1 and 2) will be referred to as a "second rotational direction" as appropriate.

As illustrated in FIG. 5, the distal end portion of the piston rod 42 is provided with a recessed portion 43 that extends from the distal end side toward the base end side, and a pair of wall portions 44a and 44b between which the recessed portion 43 is interposed. The wall portions 44a and 44b are provided with holes 45a and 45b, respectively, that face each other. The retainer member 50 is attached to the distal end portion (a projecting portion 42a that projects from the accommodation case 31) of the piston rod 42.

As illustrated in FIG. 6, the retainer member 50 includes a base portion 51, a columnar pin portion (columnar portion) 52, and a retention portion 53 constituted from a pair of leg portions 53a and 53b. The base portion 51 is formed in a flat plate shape to extend in the up-down direction in FIG. 6. The pin portion 52 is formed to extend in a direction orthogonal to the direction of extension of the base portion 51 from one end portion (upper end portion in FIG. 6) of the base portion 51. The pin portion 52 is formed to be longer than the retention portion 53 (leg portions 53a and 53b) by a certain degree (by about the length of the piston rod 42 in the front-back direction in FIG. 2). The leg portions 53a and 53b are formed to extend generally in parallel with the pin portion 52 from both sides (left and right sides in FIG. 6) of the other end portion (lower end portion in FIG. 6) of the base portion 51 and be larger than the opening portion 32a of the accommodation case 31. The leg portions 53a and 53b have hugging portions 54a and 54b that extend from the base portion 51 and distal end portions 55a and 55b that extend from the hugging portions 54a and 54b, respectively. The hugging portions 54a and 54b are formed such that the distance between the hugging portions 54a and 54b is varied from the base portion 51 side toward the distal end portions 55a and 55b side so as to extend along the outer periphery of the piston rod 42 and the distance between the hugging portions 54a and 54b on the distal end portions 55a and 55b side is less than the outside diameter (length in the left-right direction in FIG. 2) of the piston rod 42. The distal end portions 55a and 55b are formed such that the distance between the distal end portions 55a and 55b becomes gradually longer toward the distal end side and the distance between the distal end portions 55a and 55b at the distal end is more than the width of the piston rod 42. The leg portions 53a and 53b are formed to be larger than the opening portion 32a of the first case member 32 of the accommodation case 31 when the hugging portions 54a and 54b hug the piston rod 42. The retainer member 50 is attached to the piston rod 42 with the pin portion 52 inserted through the holes 45a and 45b of the wall portions 44a and 44b of the piston rod 42 and with the hugging portions 54a and 54b of the leg portions 53 and 53b hugging the piston rod 42 with the distal end portions 55a and 55b of the leg portions 53 and 53b spread out.

As illustrated in FIG. 2, the second free end portion 23 of the detent lever 20 is inserted into the recessed portion 43 of the piston rod 42. The recessed portion 26 which is formed in the second free end portion 23 is formed to extend from the outer periphery to a position in the recessed portion 43.

The piston rod 42 and the detent lever 20 are engaged with each other through engagement between the pin portion 52, which is inserted through the holes 45a and 45b of the wall portions 44a and 44b of the piston rod 42, and the recessed portion 26, which is formed in the detent lever 20.

As illustrated in FIGS. 2 and 5, a hole portion 46 that penetrates the piston rod 42 in a direction (left-right direction in FIG. 2) orthogonal to the axial direction and that extends in the axial direction is formed around the center portion of the piston rod 42 in the axial direction. A roller 47 that serves as a contacted portion is disposed inside the hole portion 46. The roller 47 is constituted as a roller bearing, and has an outside diameter that is smaller than the length of the hole portion 46 in the longitudinal direction (up-down direction in FIGS. 2 and 5). The roller 47 is rotatably supported by a support shaft 48 supported by the piston rod 42 so as to extend in parallel with the pin portion 52 of the retainer member 50.

As illustrated in FIG. 2, the piston 49 is supported by the inner wall surface of a piston chamber 31p formed by the accommodation case 31 via a seal member 58 so as to be movable in the axial direction of the piston rod 42. The piston 49 partitions the inside of the piston chamber 31p into the oil chamber 31f and a spring chamber 31s. The spring chamber 31s is defined at the upper part, in FIG. 2, of the piston chamber 31p. The return spring 59 which serves as an elastic member is disposed in the spring chamber 31s so as to be positioned between the accommodation case 31 and the piston 49. The piston rod 42 and the piston 49 are urged toward the lock side (lower side in FIGS. 1 and 2) by the return spring 59. The oil chamber 31f is defined at the lower part, in FIG. 2, of the piston chamber 31p, and communicates with the hydraulic control device via the oil hole 35a which is formed in the accommodation case 31. The piston rod 42 and the piston 49 are moved toward the unlock side (upper side in FIGS. 1 and 2) against the urging force of the return spring 59 by hydraulic oil (a hydraulic pressure) supplied from the hydraulic control device to the oil chamber 31f.

The magnetic lock device 60 is used to restrain a transition from the parking unlocked state to the parking locked state by restricting movement of the piston rod 42 and the piston 49 toward the lock side (lower side in FIG. 2) by the elastic force (urging force) of the return spring 59 when a hydraulic pressure supplied to the oil chamber 31f of the hydraulic actuator 30 is lowered as an engine of the vehicle and an oil pump driven by the engine are stopped by idle stop or the like, for example.

The magnetic lock device 60 has a lock shaft 61 that moves in the left-right direction in FIG. 2. The lock shaft 61 has an abutment portion 62 that is provided at the distal end portion (left end portion in FIG. 2) thereof and that can abut against the roller 47 which is provided to the piston rod 42 and which serves as the contacted portion. The distal end portion of the lock shaft 61 enters the accommodation case 31 from the opening portion 32b of the first case member 32 of the accommodation case 31. The abutment portion 62 is positioned in the hole portion 46 of the piston rod 42, and overlaps at least a part of the outer peripheral surface of the roller 47 as seen in the axial direction (up-down direction in FIG. 2) of the piston rod 42. The abutment portion 62 has a first abutment surface 62a positioned on the lock side (lower side in FIG. 2) and a second abutment surface 62b positioned on the unlock side (upper side in FIG. 2). The first abutment surface 62a is formed to be inclined toward the lock side (lower side in FIG. 2) as the first abutment surface 62a extends from the distal end side toward the base end side of the lock shaft 61. The second abutment surface 62b is formed to be inclined toward the unlock side (upper side in FIG. 2) as the second abutment surface 62b extends from the distal end side toward the base end side of the lock shaft 61.

In the magnetic lock device 60, the lock shaft 61 is urged toward the piston rod 42 side (left side in FIG. 2) by a spring (not illustrated). When movement of the lock shaft 61 is restricted by a magnetic force, movement of the piston rod 42 in the up-down direction in FIG. 2 is restricted when the roller 47 of the piston rod 42 and the abutment portion 62 of the lock shaft 61 abut against each other. When movement of the lock shaft 61 is not restricted, on the other hand, the lock shaft 61 allows the piston rod 42 to be moved rightward in FIG. 2 by a component, which is directed rightward in FIG. 2, of the force which is applied from the roller 47 to the abutment portion 62 when the roller 47 of the piston rod 42 and the abutment portion 62 of the lock shaft 61 abut against each other.

Next, operation of the parking device 10 according to the embodiment configured as described above will be described.

When a hydraulic pressure (hydraulic oil) is not supplied from the hydraulic control device to the oil chamber 31f of the hydraulic actuator 30, the parking device 10 is in the state of FIG. 2. In this event, in the hydraulic actuator 30, the piston rod 42 and the piston 49 are urged toward the lock side (lower side in FIG. 2) by the return spring 59 to become closest to the bottom portion of the oil chamber 31f, and the amount of projection of the piston rod 42 from the accommodation case 31 is the smallest. The amount of stroke of the piston rod 42 and the piston 49 at this time is determined as zero. Consequently, the parking rod 14 which is coupled to the piston rod 42 via the detent lever 20 becomes closest to the base end portion of the parking pawl 13, and the parking pawl 13 is pressed by the cam member 15, which is urged by the cam spring 17, so as to be engaged with the parking gear 12, which locks the rotary shaft of the transmission to establish a parking locked state. The rotational position of the detent lever 20 at this time will hereinafter be referred to as a "locked rotational position". That is, when the amount of stroke of the piston rod 42 and the piston 49 is zero (at the time of a zero stroke), the detent lever 20 is at the locked rotational position, and the parking locked state is established. In this event, the opening of the recessed portion 26 of the detent lever 20 is directed to be inclined in the second rotational direction (clockwise direction in FIGS. 1 and 2) with respect to the lock side in the direction of movement of the piston rod 42. Specifically, the opening is directed (directed to the lower left side in FIG. 2) to be inclined, with respect to the lock side (lower side in FIG. 2) in the direction of movement of the piston rod 42 (first direction), toward a side away from the supporting shaft 20s (toward the left side in FIG. 2) in the direction of movement of the lock shaft 61 (second direction). In this event, further, a first predetermined clearance is formed between the roller 47 and the first abutment surface 62a of the abutment portion 62 of the lock shaft 61.

Figure 7:
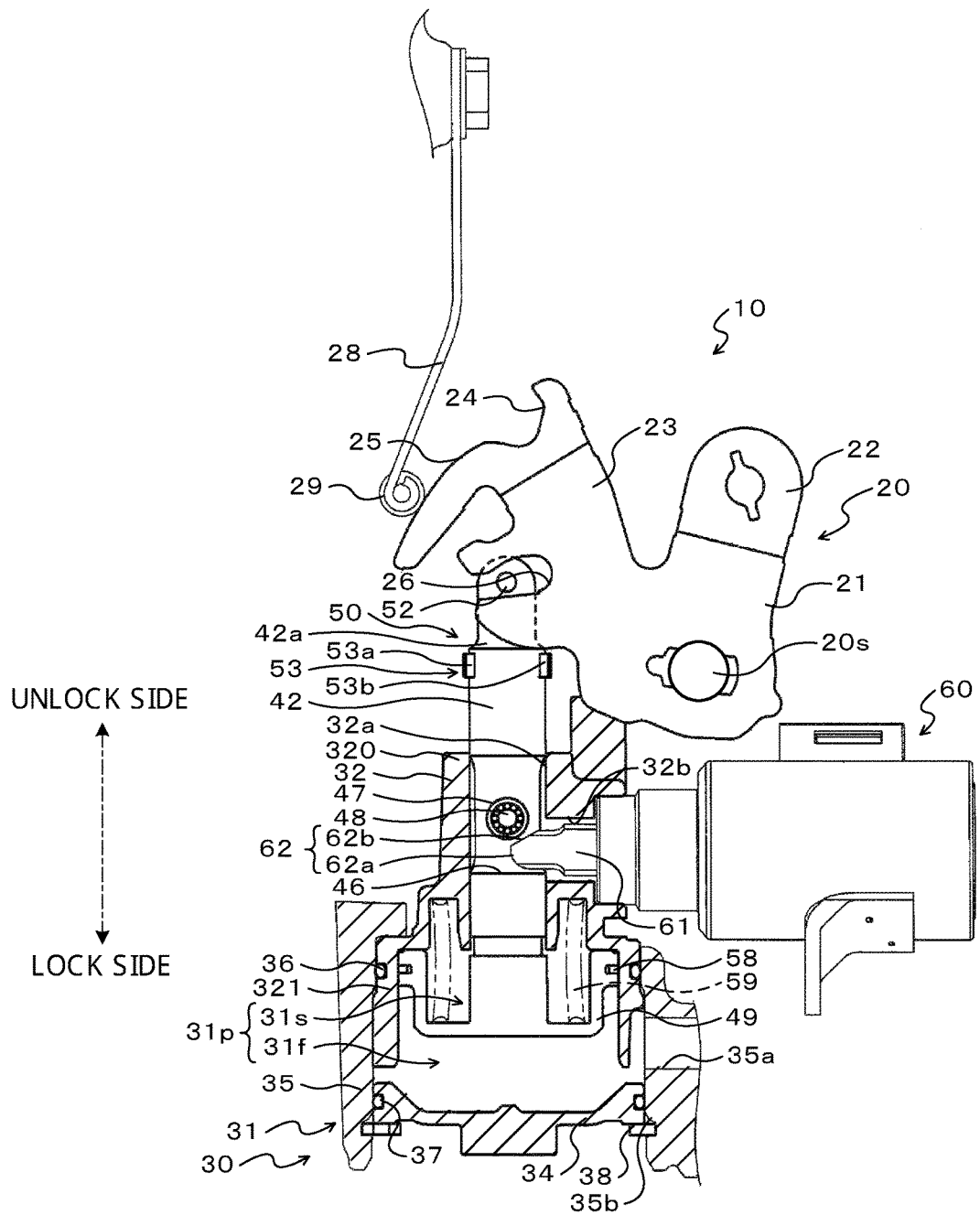
FIG. 7 illustrates operation of the parking device 10.

When a transition is made from the parking locked state to the parking unlocked state in accordance with a change of the shift lever, a hydraulic pressure from the hydraulic control device is supplied to the oil chamber 31f of the hydraulic actuator 30. In this event, movement of the lock shaft 61 is not restricted (restriction is canceled). When a hydraulic pressure is supplied to the oil chamber 31f, the piston rod 42 and the piston 49 are moved toward the unlock side (upper side in FIG. 2) against the elastic force of the return spring 59 by a hydraulic pressure in the oil chamber 31f. When the roller 47 of the piston rod 42 and the first abutment surface 62a of the abutment portion 62 of the lock shaft 61 abut against each other, the piston rod 42 and the piston 49 are further moved toward the unlock side (upper side in FIG. 2), while moving the lock shaft 61 rightward in FIG. 2 using a component, which is directed rightward in FIG. 2, of the force which is applied from the roller 47 to the first abutment surface 62a, and stopped at a position at which a second predetermined clearance is formed between the roller 47 and the second abutment surface 62b of the abutment portion 62 of the lock shaft 61 as illustrated in FIG. 7. The amount of stroke of the piston rod 42 and the piston 49 at this time is determined as being maximum (full). When abutment between the roller 47 and the first abutment surface 62a is ended, the lock shaft 61 is moved leftward in FIG. 2 by the urging force of a spring (not illustrated). When the piston rod 42 is moved toward the unlock side (upper side in FIG. 2) in this way, the detent lever 20 is turned in the second rotational direction (clockwise in FIG. 1) about the supporting shaft 20s, the parking rod 14 is moved rightward in FIG. 1, and the parking pawl 13 is not pressed by the cam member 15 any more, which releases engagement between the parking gear 12 and the parking pawl 13 (lock of the rotary shaft of the transmission) to establish a parking unlocked state. The rotational position of the detent lever 20 at this time will hereinafter be referred to as an "unlocked rotational position". That is, when the amount of stroke of the piston rod 42 and the piston 49 is maximum (full) (at the time of a full stroke), the detent lever 20 is at the unlocked rotational position, and the parking unlocked state is established. In this event, the opening of the recessed portion 26 of the detent lever 20 is directed to be further inclined in the second rotational direction (clockwise direction in FIGS. 1 and 2), within a range in which the unlock side (upper side in FIG. 2) in the direction of movement (first direction) of the piston rod 42 is not reached, compared to when the detent lever 20 is at the locked rotational position. Specifically, the opening is directed toward the piston rod 42 side (leftward in FIG. 7) in the direction of movement (second direction) of the lock shaft 61. In this way, when the amount of stroke of the piston rod 42 and the piston 49 is changed from zero to the maximum (full), the detent lever 20 is turned from the locked rotational position to the unlocked rotational position, and switching is made from the parking locked state to the parking unlocked state.

When a hydraulic pressure from the hydraulic control device is supplied to the oil chamber 31f of the hydraulic actuator 30 when the parking unlocked state is established as illustrated in FIG. 7, the parking unlocked state is held by the hydraulic pressure in the oil chamber 31f.

When a hydraulic pressure supplied to the oil chamber 31f of the hydraulic actuator 30 is lowered along with stop of the engine due to execution of idle stop or the like while the parking unlocked state is being established as illustrated in FIG. 7, the piston rod 42 is moved toward the lock side (lower side in FIG. 7) by the elastic force of the return spring 59, and the roller 47 of the piston rod 42 and the second abutment surface 62b of the abutment portion 62 of the lock shaft 61 abut against each other. In this event, movement of the piston rod 42 toward the lock side (lower side in FIG. 7) can be restricted by restricting movement of the lock shaft 61 using a magnetic force. Consequently, the parking unlocked state can be held.

When a transition is made from the parking unlocked state to the parking locked state in accordance with a change of the shift lever while the parking unlocked state is being established as illustrated in FIG. 7, a hydraulic pressure is not supplied to the oil chamber 31f of the hydraulic actuator 30. In this event, movement of the lock shaft 61 is not restricted. When a hydraulic pressure in the oil chamber 31f is lowered, the piston rod 42 and the piston 49 are moved toward the lock side (lower side in FIG. 7) by the elastic force of the return spring 59. As discussed above, when the detent lever 20 is at the unlocked rotational position, the opening of the recessed portion 26 of the detent lever 20 is directed leftward in FIG. 2. Therefore, a larger force can be transferred from the pin portion 52 of the retainer member 50 to the inner wall of the recessed portion 26 of the detent lever 20, when the piston rod 42 is moved toward the lock side, compared to a case where the opening of the recessed portion 26 of the detent lever 20 is directed toward the lower left side in FIG. 2. When the roller 47 of the piston rod 42 and the second abutment surface 62b of the abutment portion 62 of the lock shaft 61 abut against each other, the piston rod 42 and the piston 49 are further moved toward the lock side (lower side in FIG. 7), while moving the lock shaft 61 rightward in FIG. 7 using a component, which is directed rightward in FIG. 7, of the force which is applied from the roller 47 to the second abutment surface 62b, and stopped at a position at which a first predetermined clearance is formed between the roller 47 and the first abutment surface 62a of the lock shaft 61 as illustrated in FIG. 2. When the piston rod 42 is moved toward the lock side (lower side in FIG. 7) in this way, the detent lever 20 is turned in the first rotational direction (counterclockwise in FIG. 1) about the supporting shaft 20s, the parking rod 14 is moved leftward in FIG. 1, and the parking pawl 13 is pressed to be engaged with the parking gear 12 by the cam member 15 which is urged by the cam spring 17, which locks the rotary shaft of the transmission to establish a parking locked state. In this event, the rotational position of the detent lever 20 is at the locked rotational position. In this way, when the amount of stroke of the piston rod 42 and the piston 49 is changed from the maximum (full) to zero, the detent lever 20 is turned from the unlocked rotational position to the locked rotational position, and switching is made from the parking unlocked state to the parking locked state.

Figure 8:
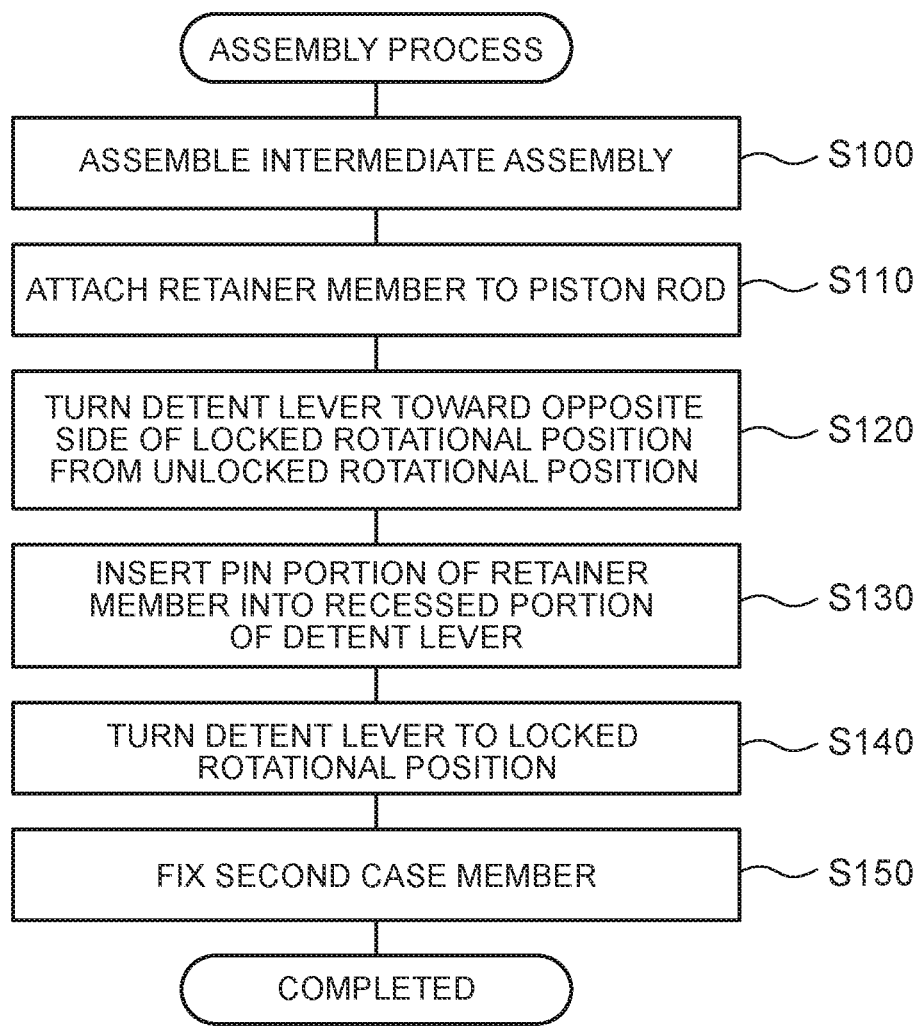
FIG. 8 is a process chart illustrating an example of an assembly process for assembling the hydraulic actuator 30.

Next, the work of assembling the parking device 10, in particular the work of assembling the hydraulic actuator 30 after assembling the parking gear 12, the parking pawl 13, the parking rod 14, the cam member 15, the support roller 16, the cam spring 17, the detent lever 20, and so forth, will be described. FIG. 8 is a process chart illustrating an example of an assembly process for assembling the hydraulic actuator 30.

First, the first case member 32, the return spring 59, the piston rod 42, and the piston 49 are disposed such that the return spring 59 is positioned in the spring chamber 31s and the distal end portion of the piston rod 42 projects from the opening portion 32a of the first case member 32 (step S100). This assembly will hereinafter be referred to as an "intermediate assembly".

Subsequently, the retainer member 50 is attached to the distal end portion of the piston rod 42 from the back side in FIG. 5 (step S110). To attach the retainer member 50 to the piston rod 42, first, the retainer member 50 is disposed such that the pin portion 52 of the retainer member 50 passes through the hole 45a and enters a part of the hole 45b and the distal end portions 55a and 55b of the leg portions 53a and 53b abut against the outer periphery of the distal end portion (projecting portion 42a which projects from the first case member 32) of the piston rod 42. As discussed above, the retainer member 50 is formed such that the pin portion 52 is longer than the retention portion 53 (leg portions 53a and 53*b*) by a certain degree (by about the length of the piston rod 42 in the front-back direction in FIG. 2). Thus, the retainer member 50 can be positioned easily, when attaching the retainer member 50 to the piston rod 42, by disposing the retainer member 50 in this way. Although the pin portion 52 is described as entering the hole 45*b* in this event, the pin portion 52 may pass through the hole 45*b*. When the base portion 51 of the retainer member 50 is pressed from the back side in FIG. 6, the pin portion 52 passes through the hole 45*b*, and the hugging portions 54*a* and 54*b* of the leg portions 53*a* and 53*b* hug the piston rod 42 with the distal end portions 55*a* and 55*b* of the leg portions 53*a* and 53*b* spread out. In this case, there is no need to perform the work of attaching the retainer member 50 around the recessed portion 26 of the detent lever 20, and such work can be performed in a relatively large space, which can improve the workability. The leg portions 53*a* and 53*b* are formed to be larger than the opening portion 32*a* of the first case member 32 of the accommodation case 31 when hugging the piston rod 42. Thus, the piston rod 42 can be restrained from slipping out of the first case member 32 after the retainer member 50 is attached to the piston rod 42.

Figure 9:
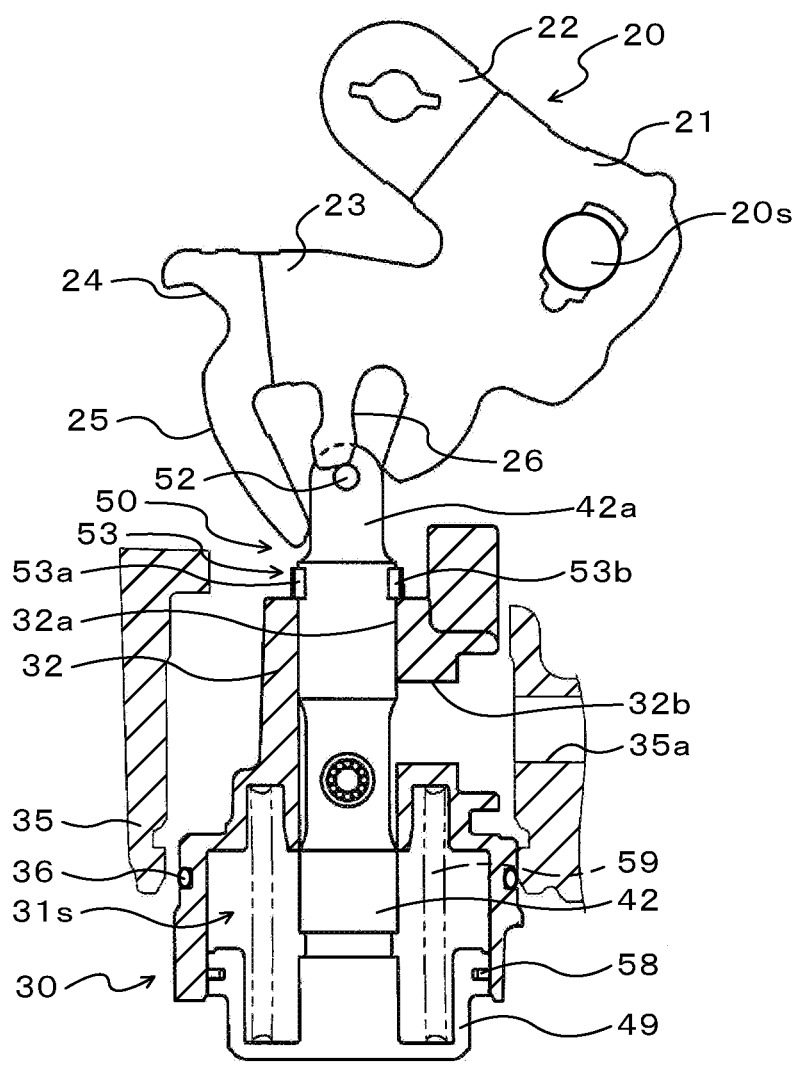
FIG. 9 illustrates how the hydraulic actuator 30 is assembled.

Subsequently, as illustrated in FIG. 9, the detent lever 20 is turned toward the opposite side of the locked rotational position (rotational position in the state of FIG. 2) from the unlocked rotational position (rotational position in FIG. 7) (step S120 in FIG. 8). In this event, the opening of the recessed portion 26 of the detent lever 20 is directed downward in FIG. 9. The seal member 36 is disposed in the recessed portion in the outer periphery of the first case member 32, and the intermediate assembly is moved upward in FIG. 9 such that the pin portion 52 of the retainer member 50 enters the recessed portion 26 of the detent lever 20 (step S130 in FIG. 8). The intermediate assembly is moved upward in FIG. 9 such that the first case member 32 is retained by the third case member 35 which is fixed to the transmission case and the detent lever 20 is turned to the locked rotational position with the recessed portion 26 of the detent lever 20 pushed by the pin portion 52 of the retainer member 50 (step S140 in FIG. 8). Consequently, the piston rod 42 and the detent lever 20 can be engaged with each other easily and in a short time. After that, the seal member 37 is disposed in the recessed portion in the outer periphery of the second case member 34, the second case member 34 is inserted into the third case member 35, and the snap ring 38 is fitted with the recessed portion 35*b* of the third case member 35 to fix the second case member 34 (step S150 in FIG. 8). The hydraulic actuator 30 is assembled to the transmission case in this way. Further, the roller 29 which is supported by the detent spring 28 is engaged with the recessed portion 24 of the detent lever 20, and the magnetic unit 60 is disposed and fixed. Assembly of the parking device 10 is completed in this way. After assembly of the parking device 10 is completed, the detent lever 20 is turned between the locked rotational position and the unlocked rotational position in accordance with a change of the shift lever. Thus, the opening of the recessed portion 26 of the detent lever 20 is directed between the lower left side and the left side in FIGS. 2 and 7. That is, the pin portion 52 of the retainer member 50 which is attached to the piston rod 42 does not slip out of the recessed portion 26 of the detent lever 20.

In the parking device 10 according to the embodiment described above, the detent lever 20 and the piston rod 42 are engaged with each other through engagement between the recessed portion 26 of the detent lever 20 and the pin portion 52 of the retainer member 50 which is attached to the piston rod 42. With this configuration, the detent lever 20 and the piston rod 42 can be engaged with each other easily and in a short time. As a result, the time required for the work of assembling the parking device 10 can be shortened. When the detent lever 20 is at the locked rotational position, the opening of the recessed portion of the detent lever 20 is directed to be inclined, with respect to the lock side in the direction of movement of the piston rod 42 (first direction), toward the side away from the supporting shaft 20*s* in the direction of movement of the lock shaft 61 (second direction). Thus, the pin portion 52 of the retainer member 50 which is attached to the piston rod 42 does not slip out of the recessed portion 26 of the detent lever 20.

In the parking device 10 according to the embodiment, the pin portion 52 of the retainer member 50 is formed to be longer than the retention portion 53 (leg portions 53*a* and 53*b*) by a certain degree (by about the length of the piston rod 42 in the front-back direction in FIG. 2). Thus, the retainer member 50 can be positioned easily when attaching the retainer member 50 to the piston rod 42 by disposing the retainer member 50 such that the pin portion 52 of the retainer member 50 passes through the hole 45*a* of the piston rod 42 and enters the hole 45*b* and the distal end portions 55*a* and 55*b* of the leg portions 53*a* and 53*b* of the retainer member 50 abut against the outer periphery of the distal end portion of the piston rod 42.

In the parking device 10 according to the embodiment, the piston rod 42 and the retainer member 50 are constituted separately from each other. However, such components may be formed as a single unit.

In the parking device 10 according to the embodiment, the pin portion 52 of the retainer member 50 is formed to be longer than the retention portion 53 (leg portions 53*a* and 53*b*) by a certain degree (by about the length of the piston rod 42 in the front-back direction in FIG. 2). However, the pin portion 52 may be formed to be about as long as the leg portions 53*a* and 53*b* or slightly longer than the leg portions 53*a* and 53*b*.

In the parking device 10 according to the embodiment, the piston rod 42 and the piston 49 are urged toward the lock side (toward the side on which the parking locked state is established) by the elastic force of the return spring 59, and moved toward the unlock side (toward the side on which the parking unlocked state is established) by a hydraulic pressure that resists against the elastic force of the return spring 59. Conversely, however, the piston rod 42 and the piston 49 may be urged toward the unlock side by the elastic force of a return spring, and may be moved toward the lock side by a hydraulic pressure that resists against the elastic force of the return spring.

The present disclosure provides a parking device (10) including: a parking gear (12) attached to a rotary shaft of a transmission; a detent lever (20) that turns about a supporting shaft (20*s*); a parking pawl (13) that is engaged with and disengaged from the parking gear (12) in accordance with a turn of the detent lever (20); a hydraulic unit (30) that has a moving member (42, 50) that moves in a first direction and that locks and unlocks the rotary shaft by turning the detent lever (20) in a first rotational direction about the supporting shaft (20*s*) to a first rotational position with the moving member (42, 50) moved to a first position in the first direction on one side in the first direction and at a zero stroke by an urging force of an urging member (59) and turning the detent lever (20) in a second rotational direction, which is opposite to the first rotational direction, about the supporting shaft (20*s*) to a second rotational position with the moving member (42, 50) moved to a second position in the first direction on the other side in the first direction and at a full stroke by a hydraulic pressure; and a movement restriction unit (60) that has a movement restriction member (61) that moves in a second direction, which is orthogonal to the first direction, and that restricts movement of the moving member (42, 50) when the moving member (42, 50) and the movement restriction member (61) abut against each other by restricting movement of the movement restriction member (61). In the parking device (10), the detent lever (20) is provided with a recessed portion (26) that opens in an outer periphery of the detent lever; an engagement portion (52) that is engageable with the recessed portion (26) of the detent lever (20) is provided at one end portion of the moving member (42, 50); and when the recessed portion (26) and the engagement portion (52) are engaged with each other, the engagement portion (52) turns the detent lever (20) from the second rotational position to the first rotational position when the moving member (42, 50) is moved from the second position to the first position, and the engagement portion (52) turns the detent lever (20) from the first rotational position to the second rotational position when the moving member (42, 50) is moved from the first position to the second position.

In the parking device according to the present disclosure, the detent lever is provided with a recessed portion that opens in an outer periphery of the detent lever, and an engagement portion that is engageable with the recessed portion of the detent lever is provided at one end portion of the moving member. Further, when the recessed portion of the detent lever and the engagement portion of the moving member are engaged with each other, the engagement portion of the moving member turns the detent lever in the first rotational direction about the supporting shaft from the second rotational position (rotational position at the time when the moving member is at the second position) to the first rotational position (rotational position at the time when the moving member is at the first position) when the moving member is moved from the second position (position in the first direction at a full stroke) to the first position (position in the first direction at a zero stroke), and the engagement portion of the moving member turns the detent lever in the second rotational direction about the supporting shaft from the first rotational position to the second rotational position when the moving member is moved from the first position to the second position. With this configuration, the moving member of the hydraulic unit can be coupled to the detent lever to assemble the hydraulic unit to a case of a transmission as follows. First, the detent lever is turned in the first rotational direction about the supporting shaft toward the opposite side of the first rotational position from the second rotational position. Specifically, the detent lever is turned such that the opening of the recessed portion of the detent lever is directed generally toward one side in the first direction. Subsequently, the hydraulic unit is moved from the one side toward the other side in the first direction such that the engagement portion of the moving member enters the recessed portion of the detent lever. The hydraulic unit is further moved toward the other side in the first direction and fixed such that the detent lever is turned in the second rotational direction about the supporting shaft to the first rotational position with the recessed portion of the detent lever pushed by the engagement portion of the moving member. In this way, the moving member and the detent lever can be engaged with each other easily and in a short time. As a result, the time required for the work of assembling the parking device can be shortened.

In the thus configured parking device (10) according to the present disclosure, an opening of the recessed portion (26) of the detent lever (20) may be directed to be inclined in the second rotational direction with respect to the one side in the first direction when the detent lever (20) is at the first rotational position. This restrains the engagement portion of the moving member from slipping out of the recessed portion of the detent lever. In this case, when the detent lever (20) is at the second rotational position, the opening of the recessed portion (26) of the detent lever (20) may be directed to be inclined more in the second rotational direction, within a range in which the other side in the first direction is not reached, than when the detent lever (20) is at the first rotational position. This allows transfer of a larger force from the engagement portion of the moving member to the inner wall of the recessed portion of the detent lever when the moving member is moved toward one side in the first direction.

In the parking device (10) according to the present disclosure, the moving member (42, 50) may have a shaft member (42) that extends in the first direction and an engagement member (50) that has the engagement portion (52) and that is attached to the one end portion of the shaft member (42); and the engagement portion (52) may be engaged with the recessed portion (26) of the detent lever (20) with the engagement member (50) attached to the shaft member (42). In this case, it is only necessary to engage the engagement portion of the engagement member and the recessed portion of the detent lever with each other after the engagement member is attached to the shaft member. Thus, attachment of the engagement member to the shaft member can be performed in a relatively large space, which improves the workability.

In the parking device (10) according to this aspect of the present disclosure, the hydraulic unit (30) may have an accommodation case (31) that accommodates the moving member (42, 50) such that a part of the shaft member (42) on a side of the one end portion projects from an opening portion (32a); the one end portion of the shaft member (42) may have a pair of wall portions (44a, 44b) between which a recessed portion (43) is interposed, the recessed portion (43) passing through the one end portion in a direction orthogonal to the first direction and extending from a distal end side toward a base end side; respective holes (45a, 45b) may be formed in the pair of wall portions (44a, 44b) so as to face each other; and the engagement member (50) may have the engagement portion (52) which is columnar and which passes through the holes (45a, 45b) of both of the pair of wall portions (44a, 44b), and a retention portion (53) that restrains the shaft member (42) from slipping out from a portion of the accommodation case (31) on the opposite side from the opening portion (32a) when the retention portion (53) is mounted on a projecting portion (42a) of the shaft member (42) that projects from the accommodation case (31). This restrains the shaft member from slipping out from the portion of the accommodation case on the opposite side from the opening portion.

In the parking device (10) according to this aspect of the present disclosure, the retention portion (53) may be mounted on the projecting portion (42a) of the shaft member (42) with distal end portions (55a, 55b) of the retention portion (53) spread out; and the engagement portion (52) may pass through one (45a) of the holes of the pair of wall portions (44a, 44b) and enters the other hole (45b) when the distal end portions (55a, 55b) abut against the projecting portion (42a) of the shaft member (42) without being spread out. This facilitates positioning when attaching the engagement member to the moving member.

In the parking device (10) according to the present disclosure, the rotary shaft may be locked at the first rotational position; and the rotary shaft may be unlocked at the second rotational position.

The present disclosure also provides a method of assembling the parking device according to any one of the aspects of the present disclosure, the method including: (a) a step (S120) of turning the detent lever (20) toward an opposite side of the first rotational position from the second rotational position; (b) a step (S130) of moving the hydraulic unit (30) from the one side toward the other side in the first direction such that the engagement portion (52) of the moving member (42, 50) enters the recessed portion (26) of the detent lever (20); and (c) a step (S140) of further moving the hydraulic unit (30) toward the other side in the first direction and fixing the hydraulic unit (30) such that the detent lever (20) is turned to the first rotational position with the recessed portion (26) of the detent lever (20) pushed by the engagement portion (52) of the moving member (42, 50).

In the method of assembling the parking device according to the present disclosure, first, the detent lever is turned toward an opposite side of the first rotational position from the second rotational position. Subsequently, the hydraulic unit is moved from the one side toward the other side in the first direction such that the engagement portion of the moving member enters the recessed portion of the detent lever. The hydraulic unit is further moved toward the other side in the first direction and fixed such that the detent lever is turned to the first rotational position with the recessed portion of the detent lever pushed by the engagement portion of the moving member. In this way, the moving member and the detent lever can be engaged with each other easily and in a short time. As a result, the time required for the work of assembling the parking device can be shortened.

While a mode for carrying out the present disclosure has been described above by way of an embodiment, it is a matter of course that the present disclosure is not limited to the embodiment in any way, and that the present disclosure may be implemented in various forms without departing from the scope and sprit of the present disclosure.

INDUSTRIAL APPLICABILITY

The present disclosure is applicable to the parking device manufacturing industry and so forth.

The invention claimed is:

1. A parking device comprising:
a parking gear attached to a rotary shaft of a transmission;
a detent lever that turns about a supporting shaft;
a parking pawl that is engaged with and disengaged from the parking gear in accordance with a turn of the detent lever;
a hydraulic actuator that has a moving member that moves in a first direction and that locks and unlocks the rotary shaft by turning the detent lever in a first rotational direction about the supporting shaft to a first rotational position with the moving member moved to a first position in the first direction on one side in the first direction and at a zero stroke by an urging force of an urging member and turning the detent lever in a second rotational direction, which is opposite to the first rotational direction, about the supporting shaft to a second rotational position with the moving member moved to a second position in the first direction on the other side in the first direction and at a full stroke by a hydraulic pressure; and
a movement restriction unit that has a movement restriction member that moves in a second direction, which is orthogonal to the first direction, and that restricts movement of the moving member when the moving member and the movement restriction member abut against each other by restricting movement of the movement restriction member, wherein
the detent lever is provided with a recessed portion that opens in an outer periphery of the detent lever,
an engagement portion that engages with the recessed portion of the detent lever is provided at one end portion of the moving member, and
when the recessed portion and the engagement portion are engaged with each other, the engagement portion turns the detent lever from the second rotational position to the first rotational position when the moving member is moved from the second position to the first position, and the engagement portion turns the detent lever from the first rotational position to the second rotational position when the moving member is moved from the first position to the second position.

2. The parking device according to claim 1, wherein
an opening of the recessed portion of the detent lever faces a direction between the first direction and the second direction when the detent lever is at the first rotational position.

3. The parking device according to claim 2, wherein
when the detent lever is at the second rotational position, the opening of the recessed portion of the detent lever faces a direction more aligned with the second direction than when the detent lever is at the first rotational position.

4. The parking device according to claim 3, wherein
the moving member has a shaft member that extends in the first direction and an engagement member that has the engagement portion and that is attached to one end portion of the shaft member, and
the engagement portion is engaged with the recessed portion of the detent lever with the engagement member attached to the shaft member.

5. The parking device according to claim 4, wherein
the hydraulic actuator has an accommodation case that accommodates the moving member such that a part of the shaft member on the one end portion of the shaft member side projects from an opening portion,
the one end portion of the shaft member has a pair of wall portions between which a recessed portion is interposed, the recessed portion passing through the one end portion of the shaft member in a direction orthogonal to the first direction and extending from a distal end side toward a base end side,
respective holes are formed in the pair of wall portions so as to face each other, and
the engagement member has the engagement portion which is columnar and which passes through the holes of both of the pair of wall portions, and a retention portion that restrains the shaft member from slipping out from a portion of the accommodation case on the opposite side from the opening portion when the retention portion is mounted on a projecting portion of the shaft member that projects from the accommodation case.

6. The parking device according to claim 5, wherein
- the retention portion is mounted on the projecting portion of the shaft member with distal end portions of the retention portion spread out, and
- the engagement portion passes through one of the holes of the pair of wall portions and enters the other hole when the distal end portions abut against the projecting portion of the shaft member without being spread out.

7. The parking device according to claim 6, wherein
- the rotary shaft is locked at the first rotational position, and
- the rotary shaft is unlocked at the second rotational position.

8. A method of assembling the parking device according to claim 7, the method comprising:
- (a) a step of turning the detent lever in the first rotational direction away from the first rotational position, the first rotational direction being a direction that is opposite from the second rotational position;
- (b) a step of moving the hydraulic actuator from the one side toward the other side in the first direction such that the engagement portion of the moving member enters the recessed portion of the detent lever; and
- (c) a step of further moving the hydraulic actuator toward the other side in the first direction and fixing the hydraulic actuator such that the detent lever is turned to the first rotational position with the recessed portion of the detent lever pushed by the engagement portion of the moving member.

9. The parking device according to claim 2, wherein
- the moving member has a shaft member that extends in the first direction and an engagement member that has the engagement portion and that is attached to one end portion of the shaft member, and
- the engagement portion is engaged with the recessed portion of the detent lever with the engagement member attached to the shaft member.

10. The parking device according to claim 9, wherein
- the hydraulic actuator has an accommodation case that accommodates the moving member such that a part of the shaft member on the one end portion of the shaft member side projects from an opening portion,
- the one end portion of the shaft member has a pair of wall portions between which a recessed portion is interposed, the recessed portion passing through the one end portion of the shaft member in a direction orthogonal to the first direction and extending from a distal end side toward a base end side,
- respective holes are formed in the pair of wall portions so as to face each other, and
- the engagement member has the engagement portion which is columnar and which passes through the holes of both of the pair of wall portions, and a retention portion that restrains the shaft member from slipping out from a portion of the accommodation case on the opposite side from the opening portion when the retention portion is mounted on a projecting portion of the shaft member that projects from the accommodation case.

11. The parking device according to claim 10, wherein
- the retention portion is mounted on the projecting portion of the shaft member with distal end portions of the retention portion spread out, and
- the engagement portion passes through one of the holes of the pair of wall portions and enters the other hole when the distal end portions abut against the projecting portion of the shaft member without being spread out.

12. The parking device according to claim 1, wherein
- the moving member has a shaft member that extends in the first direction and an engagement member that has the engagement portion and that is attached to one end portion of the shaft member, and
- the engagement portion is engaged with the recessed portion of the detent lever with the engagement member attached to the shaft member.

13. The parking device according to claim 12, wherein
- the hydraulic actuator has an accommodation case that accommodates the moving member such that a part of the shaft member on the one end portion of the shaft member side projects from an opening portion,
- the one end portion of the shaft member has a pair of wall portions between which a recessed portion is interposed, the recessed portion passing through the one end portion of the shaft member in a direction orthogonal to the first direction and extending from a distal end side toward a base end side,
- respective holes are formed in the pair of wall portions so as to face each other, and
- the engagement member has the engagement portion which is columnar and which passes through the holes of both of the pair of wall portions, and a retention portion that restrains the shaft member from slipping out from a portion of the accommodation case on the opposite side from the opening portion when the retention portion is mounted on a projecting portion of the shaft member that projects from the accommodation case.

14. The parking device according to claim 13, wherein
- the retention portion is mounted on the projecting portion of the shaft member with distal end portions of the retention portion spread out, and
- the engagement portion passes through one of the holes of the pair of wall portions and enters the other hole when the distal end portions abut against the projecting portion of the shaft member without being spread out.

15. The parking device according to claim 1, wherein
- the rotary shaft is locked at the first rotational position, and
- the rotary shaft is unlocked at the second rotational position.

16. A method of assembling the parking device according to claim 1, the method comprising:
- (a) a step of turning the detent lever in the first rotational direction away from the first rotational position, the first rotational direction being a direction that is opposite from the second rotational position;
- (b) a step of moving the hydraulic actuator from the one side toward the other side in the first direction such that the engagement portion of the moving member enters the recessed portion of the detent lever; and
- (c) a step of further moving the hydraulic actuator toward the other side in the first direction and fixing the hydraulic actuator such that the detent lever is turned to the first rotational position with the recessed portion of the detent lever pushed by the engagement portion of the moving member.

* * * * *